3,262,503
APPARATUS FOR HARVESTING AND COLLECTING CROPS SOWN OR PLANTED IN ROWS
Harm Zijlstra, deceased, late of Veendam, Netherlands, by Aaltje Zijlstra-Daniëls, executrix, Veendam, Netherlands, and Hendrik Foeke van der Laan, Veendam, Netherlands, assignors to Mechanox N.V., Veendam, Netherlands
Filed Dec. 21, 1964, Ser. No. 420,212
Claims priority, application Netherlands, May 4, 1961, 264,386
5 Claims. (Cl. 171—61)

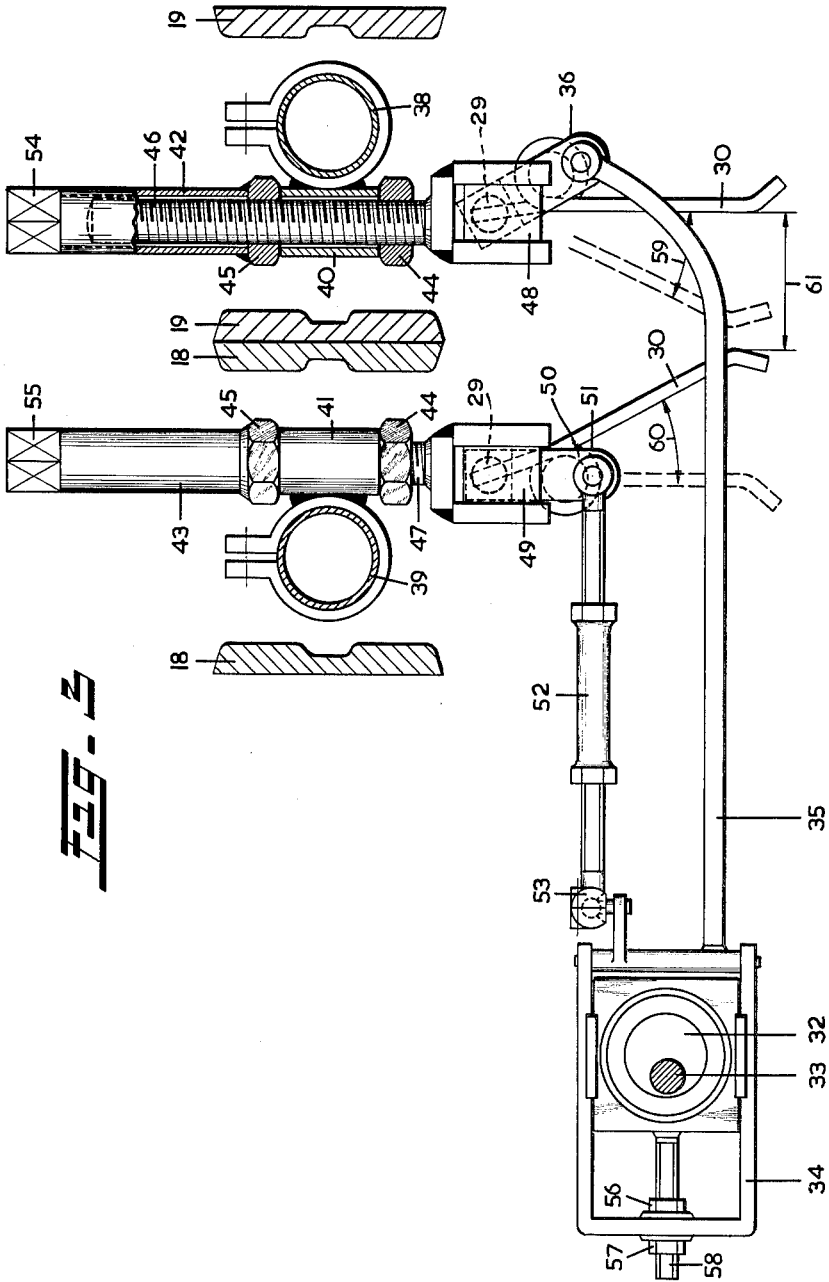

The present invention is a continuation-in-part of my application Serial No. 191,124, filed April 30, 1962, now abandoned; and relates to an apparatus for harvesting and collecting crops sown or planted in rows, said apparatus comprising a supported travelling frame, a coulter secured to said frame and being vertically adjustable relative to a support of said frame, a collecting device carried by said frame, and a conveyor disposed between said plough-share and said collector means.

Such an apparatus is well-known for digging potatoes or pulling beets, the conveyor consisting of a driven rotating wheel carrying forks at its circumference. The coulter is adjusted at such a height that it cuts and raises the turf under the crop, whereupon the crop is picked up by the forks of the conveyor and collected in the collecting device.

It is an object of the present invention to make such an apparatus suitable for harvesting, transporting, cleaning and bundling crops.

To that effect, according to the invention, the apparatus for harvesting and collecting crops growing in longitudinal rows, in which the crops are spaced apart from each other and so that superfluous earth can be removed from the roots of the crops without injuring said roots comprising a wheeled frame adapted to travel along the earth, a plough-share secured to said frame for digging crops, collector means disposed on said frame for collecting crops dug by said plough-share, a conveyor consisting of two parallel disposed endless belts having forward ends disposed adjacent said collector means to receive dug crops therefrom, roller means on said frame supporting the forward and rear ends of said belts, said belts being disposed longitudinally of the path of travel of said wheeled frame with a plurality of zig-zag rollers spaced against the inner portion of each of said parallel belts so said belts portions are in contact with each other and secure and carry crops between and along said belts toward the rear end of said belts, an elongated oscillatable shaft mounted below and adjacent said belts, said shaft extending parallel to and spaced apart from the longitudinal axes of said belts, a plurality of spaced radially extending resilient pin members on said shaft extending parallel to the stem of crops held between said belt portions and distributed substantially along the entire length of the belts, means for said shaft being adapted to perform an oscillatory stroke whose angular extent can be adjusted so that said pin members remove superfluous earth from said dug crops carried between said belts. Further, the parallel distance between the oscillatory shaft and the axes of the conveyor belts also is adjustable.

According to the preferred embodiment which is disclosed herein, the apparatus comprises two of said oscillatory shafts, parallel to each other, with their respective oscillatory strokes synchronized or correlated with each other.

The invention will be further elucidated with reference to the drawing, showing an embodiment of the invention.

FIG. 3 is a schematic fragmentary sideview in the plane indicated by the line 3—3 of FIGURE 1 of the apparatus according to the invention for adjusting the reciprocable shafts provided with resilient pins.

Figure 1:
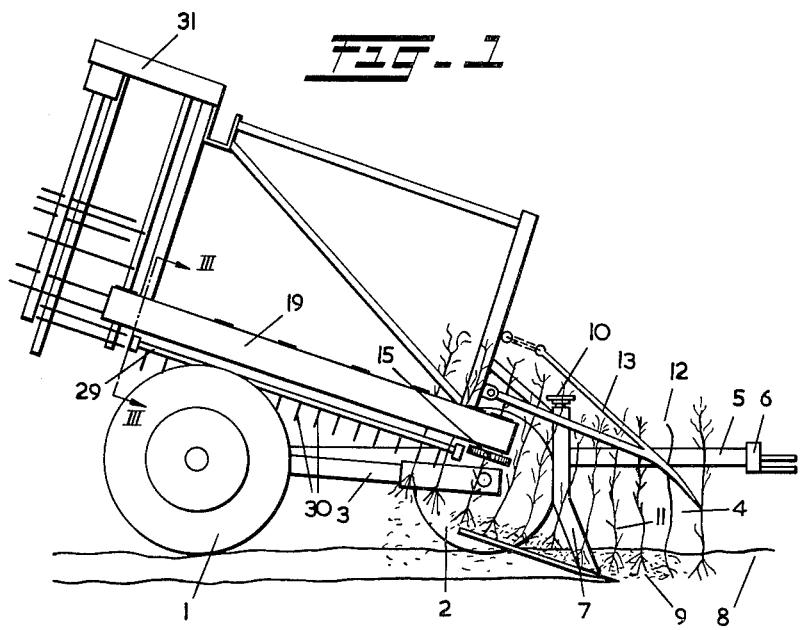
FIG. 1 is a schematic sideview of the apparatus according to the invention.

Referring to the drawing, the apparatus comprises a frame 3 supported by wheels 1 and roller 2 and adapted to be moved along plants 4 sown or planted in rows, by means of a tractor. For that purpose the frame includes suitable coupling means 6 attached to arm 5.

Figure 2:
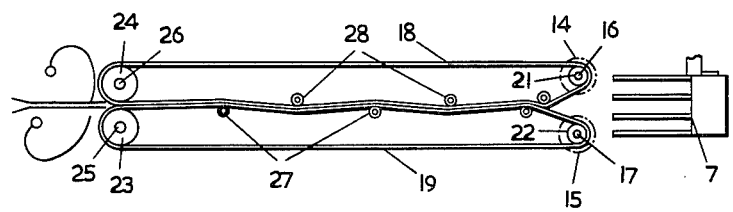
FIG. 2 is a schematic top view of the harvesting apparatus, per se; the vehicle structure being removed therefrom.

A plough-share or coulter 7 is secured to the frame laterally of the roller, and is vertically adjustable relative to the roller by means of any conventional height adjusting device 10, such as, for example, a screw-threaded arrangement for varying the height position of coulter 7 relative to the ground. The height of the coulter is so adjusted that, when the apparatus according to FIG. 1 is moved to the right, the turf 8 is cut under the roots 9 of the plants, the turf and the plants being raised over the surface of the coulter. By means of an adjustable member 13 the plants are guided by the stems 11 or the leaves 12 to the plant-engaging discs 14 and 15 (FIG. 2) mounted for rotation on parallel axles 16 and 17. These discs, which are made of rubber or other suitable material, carry teeth at their peripheries which engage the crop supplied and guide it to the conveyor.

The conveyor comprises two cooperating endless V-belts 18 and 19, which belts are guided by rollers 27, 28 mounted for rotation about parallel spindles secured by their ends to the frame 3. The endless belts are kept under tension by terminal rollers 21 to 24 mounted for rotation about axles 16, 17, 25 and 26, disposed like the angular points of a quadrangle. The guide rollers 27, 28 are disposed zigzag-fashion along and realtive to the cooperating runs of the belts. The endless belts are moved in such a manner that their cooperating runs move in the direction away from the coulter.

The endless belts are driven by any well known driving means, which may, for example, consist of one roller of each belt being drivingly connected to any convenient source of driving power.

A shaft 29 (FIG. 1), journalled in the frame and carrying radially projecting resilient pins 30, is disposed below the belts and extends in the direction of the path of travel over which the belts cooperate. This shaft is driven from the same drive means which drives the rollers for the conveyor belts, and oscillates.

The crop-engaging discs supply the crop to the conveyor, which engages the plants by the stalks between the belts and moves them to the conventional bundling device 31. During this transport the plants are shaken owing to the rollers being disposed zigzag-fashion relative to the path of travel, and the roots of the plants are combed and cleaned of soil by the resilient pins 30 carried by the shaft 29.

In the bundling device the plants are bundled as is known in mowing machines.

FIG. 3 shows schematically the manner at which the shafts 29 with the resilient pin members 30 are supported and driven. The shafts 29 are according to the invention under the belts 18 and 19 so supported that their distance from the belts can be varied depending upon the length of the roots of the crops. Both shafts 29 preform an oscillatory stroke the angle of which can be adjusted. It is important that the shafts 29 do not rotate continuously around their axis as otherwise the roots of the crops would be clutched by the pin members 30 and wound around the shafts which is not intended. The shafts oscillate in synchronism so that the pin members 30 on both shafts simultaneously move in the same direction (see FIGURE 3).

To that effect the shafts 29 are according to the invention adjustably supported by the members 38 and 39 said members being parts of the wheeled frame 3. To the members 38 and 39 the bushings 40 and 41 are fixed. Through the bushings freely pass the spindles 46 and 47 upon which are threaded the nuts 44 and 45. The nuts 45 are fixed to the pipes 42 and 43, said pipes having rectangular upper ends 54 and 55 so that said pipes can be gripped and turned by suitable tools. At their lower ends the spindles are provided with the bearings 48 and 49 for the shafts 29. When the pipes 42 and 43 by suitable tools are turned, the distance between the shafts 29 and the belts 18 and 19 is varied. Each shaft has an extending arm 36 and 50, respectively, rotatably coupled with the levers 35 and 51.

The lever 51 is by means 52 adjustable in its length and is pivotable at 53 relative to crosshead 34. The lever 35 is fixed to the crosshead 34. The crosshead 34 is supported by an eccentric 33 driven by an axle 32. Said axle 32 is supported by the wheeled frame 3 and is driven in a manner not shown by the motor of the tractor. Said crosshead 34 can be moved and adjusted with respect of the axle 32 and is therefore adjustably locked between two nuts 56 and 57 from a spindle 58 fixed to the eccentric 33. When the axle 32 is driven the crosshead 34 is moved and the lever 35 oscillates the arm 36 back and forth so that the right shaft 29 around its axes performs an oscillatory stroke the angle of which can be adjusted by adjusting the nuts 56 and 57 on the spindle 58. The angular relationship of pin members 30 on one shaft 29 relative to the corresponding pin members on the other shaft 29 is a fixed relationship during operation of the apparatus; however, this relationship can be adjustably varied by adjustment means 52.

The angle 59 over which the right shaft 29 with the pin members 30 is oscillated from the right to the left is determined by the setting of spindle 58 relative to crosshead 34. The left shaft 29 performs at the same time a corresponding movement so that the pin members 30 move from the right to the left over an angle 60. The distance 61 between the pin members 30 forms a certain passage for the roots of the crops.

It is, therefore, seen that spindle 58 determines the angular extent through which shafts 29 will oscillate while means 52 determines the distance 61 which exists between the corresponding pin members on the respective shafts.

What is claimed:

1. An apparatus for harvesting and collecting crops growing in longitudinal rows, in which the crops are spaced apart from each other and so that superfluous earth can be removed from the roots of the crops without injuring said roots, said apparatus comprising a wheeled frame adapted to travel along the earth, a plough-share secured to said frame for digging crops, collector means disposed on said frame for collecting crops dug by said plough-share, a conveyor consisting of two parallel disposed endless belts having forward ends disposed adjacent said collector means to receive dug crops therefrom, roller means on said frame supporting the forward and rear ends of said belts, said belts being disposed longitudinally of the path of travel of said wheeled frame with a plurality of longitudinally spaced rollers arranged in zig-zag relation against the inner portion of each of said parallel belts so said belts portions are in contact with each other and secure and carry crops between and along said belts toward the rear end of said belts, a shaft means comprising an elongated oscillatable shaft mounted below and adjacent said belts, said shaft extending parallel to and spaced apart from the longitudinal axes of said belts, a plurality of spaced radially extending resilient pin members on said shaft extending perpendicular to the longitudinal axis thereof and distributed substantially along the entire length of the shaft, means for oscillating said shaft about its longitudinal axis and means to vary the angular oscillatory stroke of said shaft.

2. The apparatus of claim 1, wherein said shaft means includes two of said oscillatable shafts, said shafts being spaced apart and being substantially parallel to each other in the same horizontal plane, means for oscillating both said shafts in synchronous relationship, and means to fixedly adjust the angular relationship between corresponding ones of said pins on respective ones of said shafts.

3. The apparatus of claim 2, wherein said means for oscillating said shafts includes a crosshead, an eccentric rotary member rotatively mounted about a fixed axis and drivingly associated with said crosshead so as to oscillate said crosshead pursuant to continuous rotation of said eccentric member, link means connecting said crosshead to each of said shafts whereby the oscillating of said crosshead is translated into oscillation in said shafts, said crosshead being adjustable relative to said eccentric member so as to vary the oscillatory stroke of said crosshead, the oscillatory stroke of said shafts being proportional to the stroke of said crosshead.

4. The apparatus of claim 3, wherein said means to adjust the angular relationship comprises the fact that said link means is adjustable so as to fixedly vary the rotary angular disposition of one of said shafts relative to the other.

5. The apparatus of claim 2, including means to adjust the parallel distance of said shafts relative to the axes of said belts.

References Cited by the Examiner

UNITED STATES PATENTS

| 1,148,058 | 7/1915 | Spellman | 171—61 |
| 2,368,895 | 2/1945 | Spiegl | 171—61 |
| 2,388,740 | 11/1945 | Harwood | 171—61 X |
| 2,550,332 | 4/1951 | Cross | 171—61 |

FOREIGN PATENTS 748,547   5/1956   Great Britain.

ANTONIO F. GUIDA, *Acting Primary Examiner.*